United States Patent
Krishnamurthy et al.

(10) Patent No.: US 12,328,228 B2
(45) Date of Patent: Jun. 10, 2025

(54) SYSTEMS AND METHODS FOR DEPLOYING THIRD-PARTY APPLICATIONS ON A CLUSTER OF NETWORK SWITCHES

(71) Applicant: DELL PRODUCTS L.P., Round Rock, TX (US)

(72) Inventors: Karthik Krishnamurthy, Chennai (IN); Pawan Kumar Singal, Milpitas, CA (US); Balaji Rajagopalan, Sunnyvale, CA (US); Mihai Lazar, Ontario (CA); Dhanunjayareddy Madhana, Guntur (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/863,798

(22) Filed: Jul. 13, 2022

(65) Prior Publication Data
US 2024/0022472 A1    Jan. 18, 2024

(51) Int. Cl.
*H04L 41/0893*    (2022.01)
*G06F 8/61*    (2018.01)
*G06F 9/54*    (2006.01)
*H04L 41/0894*    (2022.01)
*H04L 49/15*    (2022.01)

(52) U.S. Cl.
CPC ............ *H04L 41/0893* (2013.01); *G06F 8/63* (2013.01); *G06F 9/547* (2013.01); *H04L 41/0894* (2022.05); *H04L 49/15* (2013.01)

(58) Field of Classification Search
CPC . H04L 41/0893; H04L 49/15; H04L 41/0894; G06F 8/63; G06F 8/61; G06F 8/65
See application file for complete search history.

(56) References Cited

U.S. PATENT DOCUMENTS

| | | | |
|---|---|---|---|
| 1,469,958 A | 10/1923 | Richter | |
| 10,606,454 B2 * | 3/2020 | Pani | H04L 45/563 |
| 11,218,378 B1 * | 1/2022 | Chaganti | G06F 8/65 |
| 11,442,652 B1 | 9/2022 | Dailey et al. | |
| 11,469,958 B1 * | 10/2022 | Mackie | H04L 41/0895 |
| 11,489,723 B2 | 11/2022 | Smith et al. | |
| 11,543,966 B1 | 1/2023 | Varghese et al. | |

(Continued)

OTHER PUBLICATIONS

"Deploying Docker containers to a Cisco Catalyst 9300 with Cisco DNACenter," [online], [Retrieved Mar. 7, 2024]. Retrieved from Internet <URL:https://ccie.tv/> CISCO, 2021. (13p).

(Continued)

*Primary Examiner* — Jonathan A Bui
(74) *Attorney, Agent, or Firm* — BAUGH LAW, LLC

(57) ABSTRACT

Systems and methods provide automated, lightweight, and centralized implementations for distributing and securely managing the lifecycle of containerized third-party applications on a cluster of network switches that typically have relatively limited computing resources. The deployed containerized applications may be seamlessly updated and expanded separately from the host network operating system without the complexities involved in a registry infrastructure, such as Kubernetes, Docker, or similar container orchestration platform, without compromising security, and without interfering with the common switching functions and switching protocols of switches in the cluster.

20 Claims, 10 Drawing Sheets

(56) References Cited

U.S. PATENT DOCUMENTS

| | | |
|---|---|---|
| 11,550,734 B1 | 1/2023 | Matosevich et al. |
| 2009/0083390 A1 | 3/2009 | Abu-Ghazaleh |
| 2009/0144720 A1* | 6/2009 | Roush .............. G06F 8/65 717/171 |
| 2011/0167466 A1* | 7/2011 | Aiouaz ............. H04N 7/106 725/117 |
| 2013/0067049 A1* | 3/2013 | Ghosh .............. H04L 41/082 709/221 |
| 2014/0156667 A1 | 6/2014 | Kapadia |
| 2014/0198686 A1 | 7/2014 | Kamble |
| 2015/0124644 A1* | 5/2015 | Pani ............. G06F 3/04842 370/254 |
| 2016/0149776 A1 | 5/2016 | Pani |
| 2017/0315522 A1 | 11/2017 | Kwon |
| 2018/0011699 A1* | 1/2018 | Manthiramoorthy ... G06F 9/455 |
| 2018/0074717 A1 | 3/2018 | Olarig et al. |
| 2018/0074984 A1 | 3/2018 | Olarig et al. |
| 2018/0227182 A1* | 8/2018 | Patton ............. H04L 41/0806 |
| 2018/0241617 A1* | 8/2018 | Radzikowski ...... H04L 41/0895 |
| 2018/0246731 A1* | 8/2018 | Regmi ............. H04L 49/65 |
| 2018/0270119 A1 | 9/2018 | Ballapuram |
| 2018/0375825 A1* | 12/2018 | Nataraja ............. H04L 43/10 |
| 2019/0037033 A1 | 1/2019 | Khakimov |
| 2019/0042144 A1 | 2/2019 | Peterson et al. |
| 2020/0136996 A1 | 4/2020 | Li et al. |
| 2020/0293180 A1* | 9/2020 | Pani ............. H04L 41/0893 |
| 2020/0396126 A1 | 12/2020 | L'Ecuyer |
| 2020/0409893 A1 | 12/2020 | Puttagunta et al. |
| 2021/0042160 A1* | 2/2021 | Alamouti ........... G06F 9/5011 |
| 2021/0055947 A1* | 2/2021 | Mahajan ........... G06F 9/45558 |
| 2021/0157692 A1 | 5/2021 | MacCarthaigh |
| 2021/0286540 A1 | 9/2021 | Tylik et al. |
| 2021/0286741 A1 | 9/2021 | Smith et al. |
| 2021/0288878 A1 | 9/2021 | Smith et al. |
| 2021/0289027 A1 | 9/2021 | Smith et al. |
| 2021/0289029 A1 | 9/2021 | Smith et al. |
| 2021/0311899 A1 | 10/2021 | Smith et al. |
| 2021/0360426 A1 | 11/2021 | Kumar |
| 2021/0397351 A1 | 12/2021 | Dhatchinamoorthy et al. |
| 2022/0014435 A1* | 1/2022 | Vadapalli ............ H04L 63/0823 |
| 2022/0030062 A1 | 1/2022 | Jennings et al. |
| 2022/0066799 A1 | 3/2022 | Pinto et al. |
| 2022/0286377 A1 | 9/2022 | Smith et al. |
| 2022/0286508 A1 | 9/2022 | Smith et al. |
| 2023/0035799 A1 | 2/2023 | Desanti |
| 2023/0305700 A1 | 9/2023 | Desanti et al. |
| 2023/0325200 A1 | 10/2023 | Desanti et al. |
| 2024/0031221 A1 | 1/2024 | Rajagopalan et al. |
| 2024/0031446 A1 | 1/2024 | Rajagopalan et al. |

OTHER PUBLICATIONS

Non-Final Office Action Response filed Mar. 6, 2024, in the related matter, U.S. Appl. No. 17/869,727. (12pgs).

Non-Final Office Action Received Dec. 7, 2023, in the related matter, U.S. Appl. No. 17/869,727. (9pgs).

Notice of Allowance and Fee(s) Due, Received Mar. 22, 2024, in the related matter, U.S. Appl. No. 17/869,727. (9pgs).

Notice of Allowance and Fee(s) Due, Received Jul. 17, 2024, in the related matter, U.S. Appl. No. 17/869,727. (5pgs).

Non-Final Office Action, mailed Sep. 10, 2024, in related matter U.S. Appl. No. 17/870,351. (11pgs).

Response filed, Nov. 11, 2024, in related matter U.S. Appl. No. 17/870,351. (26pgs).

Notice of Allowance and Fee(s) Due, in the related matter, U.S. Appl. No. 17/869,727. (7pgs).

NVM Express Over Fabrics, revision 1.1, Oct. 22, 2019, [online], [Retrieved Oct. 12, 2020] Retrieved from Internet < URL:http://nvmexpress.org> (83pgs).

* cited by examiner

*1000*

SYSTEMS AND METHODS FOR DEPLOYING THIRD-PARTY APPLICATIONS ON A CLUSTER OF NETWORK SWITCHES

BACKGROUND

A. Technical Field

The present disclosure relates generally to information handling systems. More particularly, the present disclosure relates to systems and methods for deploying third-party applications in embedded environments.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently there exist no simple methods for users to install and run containerized applications in a distributed fashion on a cluster of network nodes without using a separate registry infrastructure such as Kubernetes or a Docker registry. In network switch deployments, a registry infrastructure is not needed and is impractical for various reasons. Users who wish to run containerized applications on a cluster of switches would have to install and run the applications manually on each switch and individually manage each application. Further, when expanding or updating the cluster, for example, to add or replace switches, the user would have to undertake numerous operations on each switch. Furthermore, interference with the common switching functions of a network switch renders deploying, managing, and provisioning network containerized applications in a cluster of network switches currently not feasible or at least not practicably feasible. Therefore, container orchestration platforms using an existing registry infrastructure are not suitable for embedded environments such as network switches.

Accordingly, it is highly desirable to have systems and methods that overcome the imitations of existing designs and securely distribute containerized applications and manage their lifecycle without the complexities and shortcomings in common container orchestration platforms.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
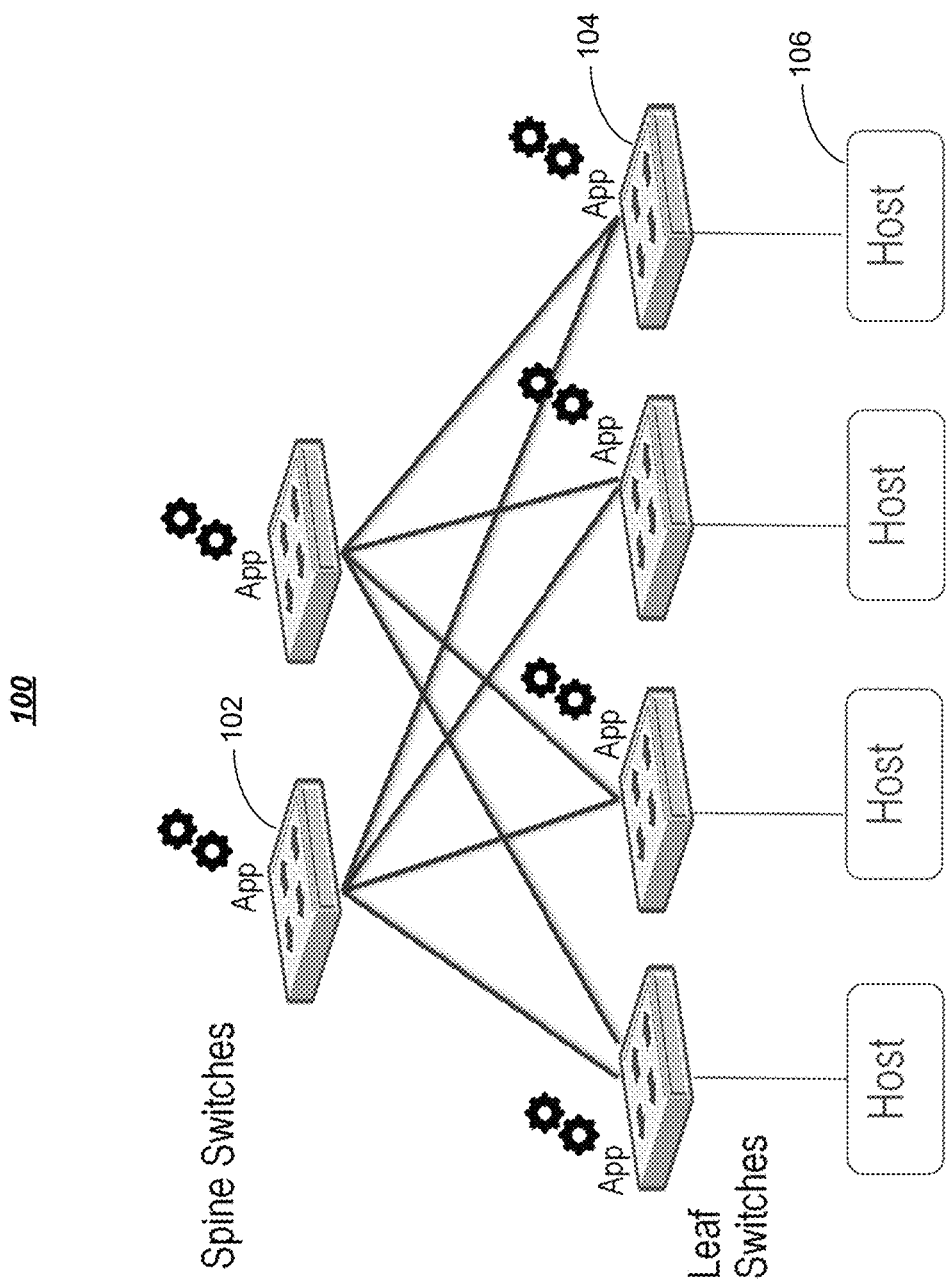
FIG. 1 ("FIG. 1") depicts a network switch topology according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to L2 networks; and the term "packet" shall not be interpreted as limiting embodiments of the present invention to L3 networks. The terms "packet," "frame," "data," or "data traffic" may be replaced by other terminologies referring to a group of bits, such as "datagram" or "cell." Each reference/document mentioned in this patent document is incorporated by reference herein in its entirety.

In this document, the terms "instance," "application," and "application instance" may be used interchangeably. Similarly, the terms "switching device" and "switch" may be used interchangeably.

FIG. 1 depicts a network switch topology according to embodiments of the present disclosure. Network 100 comprises a number of switches on which an application is to be deployed. Each network switch, e.g., spine switches (e.g., 102) or leaf switches (e.g., 104) that is coupled to hosts (e.g., 106) may be implemented as a hardware component that comprises its own network processing unit(s) (NPU)(s) and central processing unit(s) (CPU)(s).

Existing network switches that perform common switching functions operating on an NOS (e.g., Linux) possess limited computing resources such as CPU and memory. The NPU's main function is to forward packets at line rate, and the main function of a switch's CPU, unlike that of a general-purpose CPU on a server, is to manage the forwarding plane, typically with the help of various control plane protocols, workflows, etc. The CPU in a network switch manages Ethernet layer 2 (L2) and Ethernet layer 3 (L3) functionality in the forwarding plane of NPU, and a switch's control plane stack is customized to work with the NPU that is being used.

Unlike existing containerized applications that are deployed on general purpose CPU servers, e.g., in a Docker framework, which creates all Linux networking primitives with no regard to managing internet protocol (IP) tables, Linux bridges, etc., deploying containerized applications using CPUs of networking switches presents a particular challenge due to incompatibility of regular switching functions and forwarding plane management operations that may render a switch inoperable for network traffic. Thus, in existing containerized applications the use of IP tables, Linux bridges, etc., is not allowed. Further, security aspects of existing applications deployed on general purpose CPU servers is left to the administrator of the server.

In comparison, embodiments herein, which allow for deployment of containerized applications deployed on network switches, maintain the security features of the switches' CPUs and offer security for applications running thereon by limiting access to select switch CPU resources. Furthermore, the lifecycle of application deployment on general purpose CPU servers is not structured in a manner such that applications are started and stopped based on Linux tools. In contrast, operations on a switch CPU that may play a crucial role in the data path may be strictly controlled. Therefore, various embodiments herein monitor and manage a third-party application's lifecycle using well-defined or standardized interfaces, such as command line interface (CLI), representational state transfer application programming interface (REST API), to ensure that the application's lifecycle, including download, install, start, stop operations, may be retained across switch upgrades, while the abstraction provided by the API advantageously adds a layer of protection against security threats.

Overall, as a person of skill in the art will readily recognize, conventional methods of managing containerized applications on a general-purpose CPU server using, e.g., a Kubernetes or Docker registry infrastructure do not lend themselves to deploying containerized applications on network switches. Therefore, to overcome such limitations, various embodiments herein utilize APIs to automatically install and manage application deployment on a cluster of networking switches, thus, taking advantage of and utilizing computing resources of a switch, including a framework for lifecycle management of applications, without utilizing a commonly available registry infrastructure.

As discussed with reference to FIG. 2, in embodiments herein, a NOS may be extended to allow for separately managed lifecycles of containerized applications and independent of the underlying NOS firmware, which may retain its own life cycle management. As a result, third-party applications that may share the same operating system as the switch on which they are installed may nevertheless be operated independently from the underlying NOS. In addition to enhancing security, one resulting benefit is that the NOS does not need to be upgraded each time the third-party application is upgraded and vice versa. Further, advantageously, by decoupling third-party applications from the NOS, interference with switching functions of switches that otherwise could negatively impact network traffic may be avoided.

In one or more embodiments, third-party applications may be decoupled from the NOS by utilizing a fabric management tool that provides network fabric automation and deliver autonomous fabric deployment, expansion, and life cycle management. The fabric management tool further enables API-based network programming capabilities that may be used by containerized applications, depending on the specific requirement of each application. Unlike, in existing approaches, where such decoupling would require a user to log into the management software of each switch, download a container to that switch, and run the container, various embodiments herein extend fabric management and/or orchestration tools, such as, e.g., SmartFabric Services of Dell, Inc. of Round Rock, Texas, USA, from merely providing clustering for networking purposes to providing a centralized, single-point cluster management interface that may not only automatically create an infrastructure comprising a compute cluster of network switches but also centrally manage the created cluster to distribute third-party applications. Further, a suitable fabric management tool may be utilized to efficiently manage compute resources across the cluster to enable switches to automatically run containerized third-party applications without user intervention and without having to access and manage each switch individually, while preventing unwanted interference with regular switching functions of a switch and while reducing security threats. To accomplish this, in one or more embodiments, a fabric management tool according to various embodies may utilize an API to manage container-related operations, such as installing and uninstalling a containerized image, enabling and disabling a containerized application instance and starting and stopping a containerized application instance, e.g., for debugging purposes.

Figure 2:
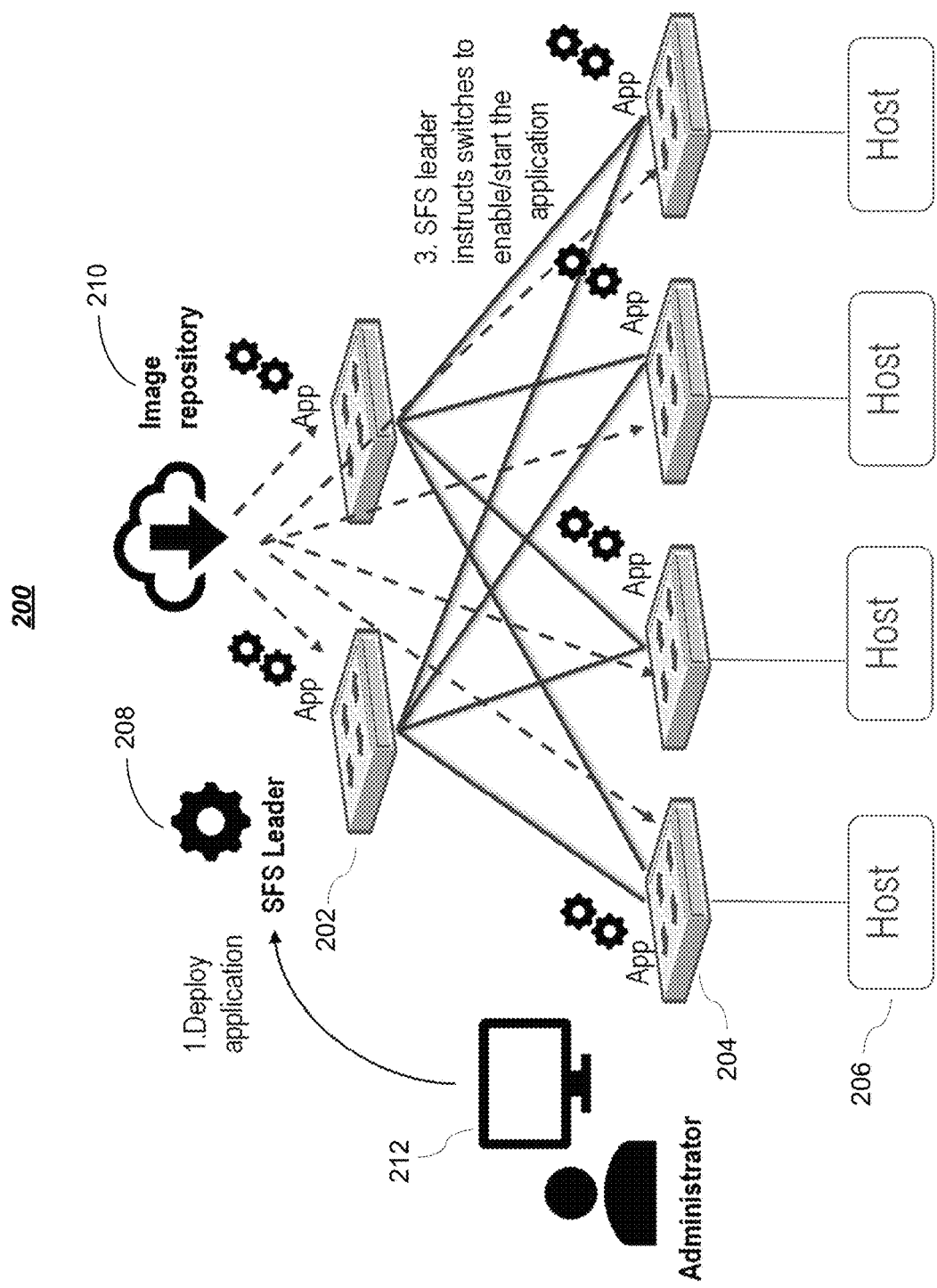
FIG. 2 depicts an exemplary automated workflow for a cluster of network switches, according to embodiments of the present disclosure.

FIG. 2 depicts an exemplary automated workflow for a cluster of network switches, according to embodiments of the present disclosure. In one or more embodiments, network 200 comprises a cluster of switches (e.g., 204) on which an application is to be deployed. The application may be stored in image repository 210. As depicted, the cluster may comprise a set of, e.g., high-bandwidth spine switches (e.g., 202) comprising a primary or leader switch 208 and a set of leaf switches (e.g., 204) that may be communicatively coupled with a set of hosts (e.g., 206) and operate various services, e.g., agent-related services. It is understood that leader switch 208 may have been selected by any process known in the art. In one or more embodiments, image repository 210 may comprise a third-party application, which may be distributed or deployed on the cluster of network switches in network 200.

In operation, an administrator may use graphical user interface (GUI) 212 (e.g., provided by a fabric administration platform) to locate and/or select a desired application and download it onto leader switch 208. The administrator may use an API (e.g., REST API) to provide to leader switch 208 details, such as the path of the image repository, application name, version, and so on. The administrator may further communicate a request or command to leader switch 208 to cause leader switch 208 to deploy or distribute a containerized third-party application to the switches in the cluster. In one or more embodiments, leader switch 208 may process the request and instruct switches in the cluster to obtain the application image from image repository 210 and download it, e.g., via the path provided by leader switch 208. It is understood that each switch may comprise an agent that may be locally installed and used to download and/or install the image.

Once the application image is downloaded, leader switch 208 may instruct other switches in the cluster to install the application image and enable and/or start the application, e.g., to perform an intended business logic, such as installing a particular image to a set of switches, according to user "intent" or policy-based networking process with little or no monitoring.

In one or more embodiments, leader switch 208 may use an API to communicate a user intent to run containerized applications in the form of, e.g., a desired functionality or constraint to a set of switches by mapping a policy to corresponding switch functions and/or parameters. In such embodiments, the user need not wait for switches to be online and ready. Instead, a set of policies for running a containerized application on a set of switches may be stored, e.g., in an intent database. As a result, leader switch 208 may install and start applications on switches as they become available online, without the user having to perform a series of steps, such as communicating the containerized application to the cluster, issuing commands to activate the application, and the like.

In one or more embodiments, a fabric management tool may further be used to execute steps, according to a set of policies or rules, on new or replaced nodes in a network cluster. Advantageously, such intent-based networking requires no user-involvement when deploying existing applications on nodes that have recently experienced a change. It is understood that the steps or functions of leader switch 208 that may be maintained in the intent database may be transferred to another switch that may take over those functions, ideally without interruptions, and resume performing steps according to the rules specified in the intent database. This is useful in failover scenarios, e.g., when leader switch 208 has been moved or has become unavailable.

In one or more embodiments, leader switch 208 may use a REST GET API command to obtain node level status information, e.g., by querying switches for various operations on containerized images and applications. As discussed in greater detail with reference to FIG. 4 and FIG. 5, before declaring an operation "failed," steps that are executed according to the user intent may be repeatedly attempted a number of times. In one or more embodiments, the fabric management application may provide retry APIs for failed operations such as, e.g., when a download from image repository 210 has failed due to an external connectivity issue. Once the external connectivity issue has been resolved, the operation that previously failed may be attempted again. Further, in one or more embodiments, once an operation related to the management of containerized application in a switch fails, the fabric management tool may generate an alert to initiate an action, e.g., by an external application.

Figure 3:
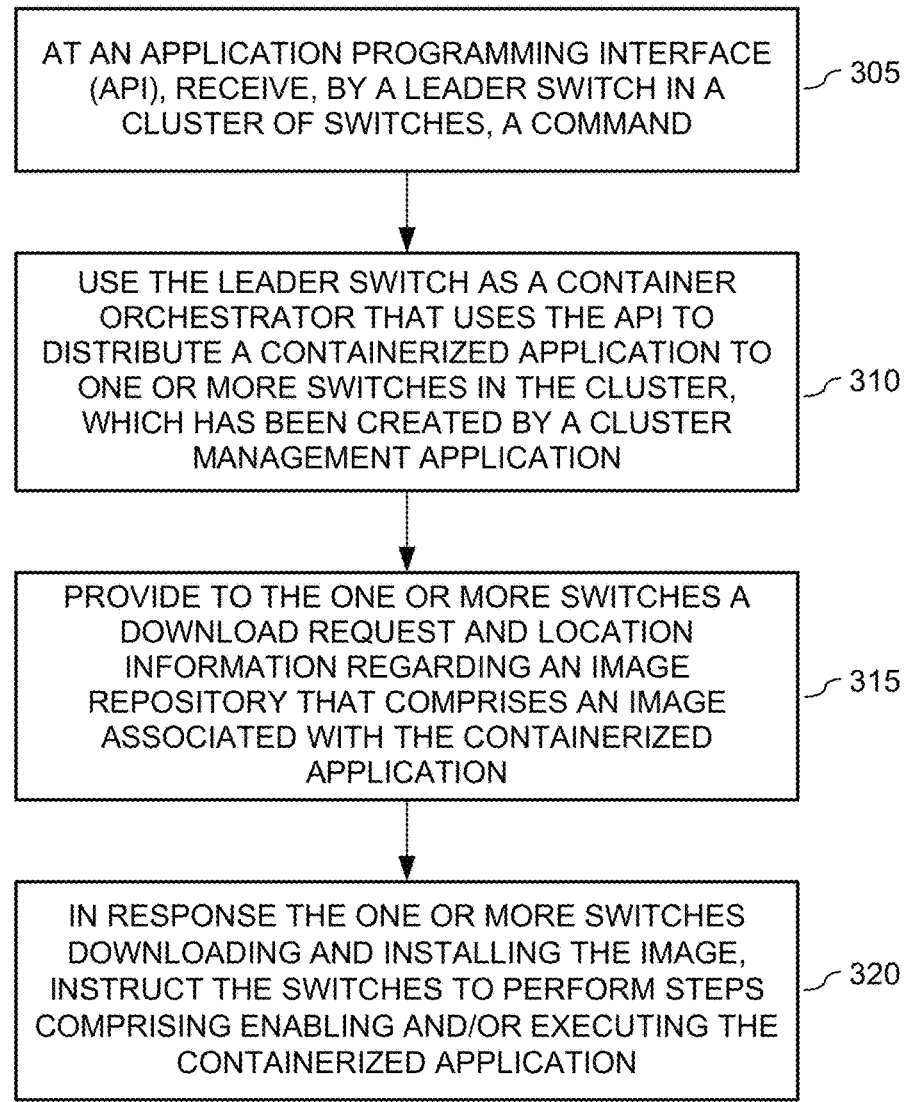
FIG. 3 is a flowchart of an exemplary process for automatically distributing third-party containerized applications, according to embodiments of the present disclosure.

FIG. 3 is a flowchart of an exemplary process for automatically distributing third-party containerized applications on a cluster of network switches, according to embodiments of the present disclosure. In one or more embodiments, process 300 for distributing containerized applications may start when a leader switch in a cluster of switches receives (305) a command, e.g., at an API via graphical user interface (GUI). In one or more embodiments, the command may have been stored in an intent database that defines a set of policies for running the containerized application.

In one or more embodiments, the leader switch may be used as a container orchestrator that uses the API, e.g., a REST API, to distribute (310) a containerized application, e.g., a third-party application a number of switches in the cluster. The cluster may have been previously created by a cluster management application. The leader may provide (315) to the switches, e.g., at different times, a download request and a location information regarding an image repository. The switches may comprise one or more agents for downloading and installing the image.

In one or more embodiments, the cluster management application may use the API to obtain the location of the image repository via the GUI and use the API to upload the image, which is associated with the containerized application, to the image repository. Once the switches download and install the image, the leader switch may instruct (320) the switches to perform steps comprising at least one of enabling or executing the containerized application.

It shall be noted that: (1) certain steps may optionally be performed; (2) steps may not be limited to the specific order set forth herein; (3) certain steps may be performed in different orders; and (4) certain steps may be done concurrently.

In one or more embodiments, a stop condition may include: (1) a set number of iterations or attempts have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

Figure 4:
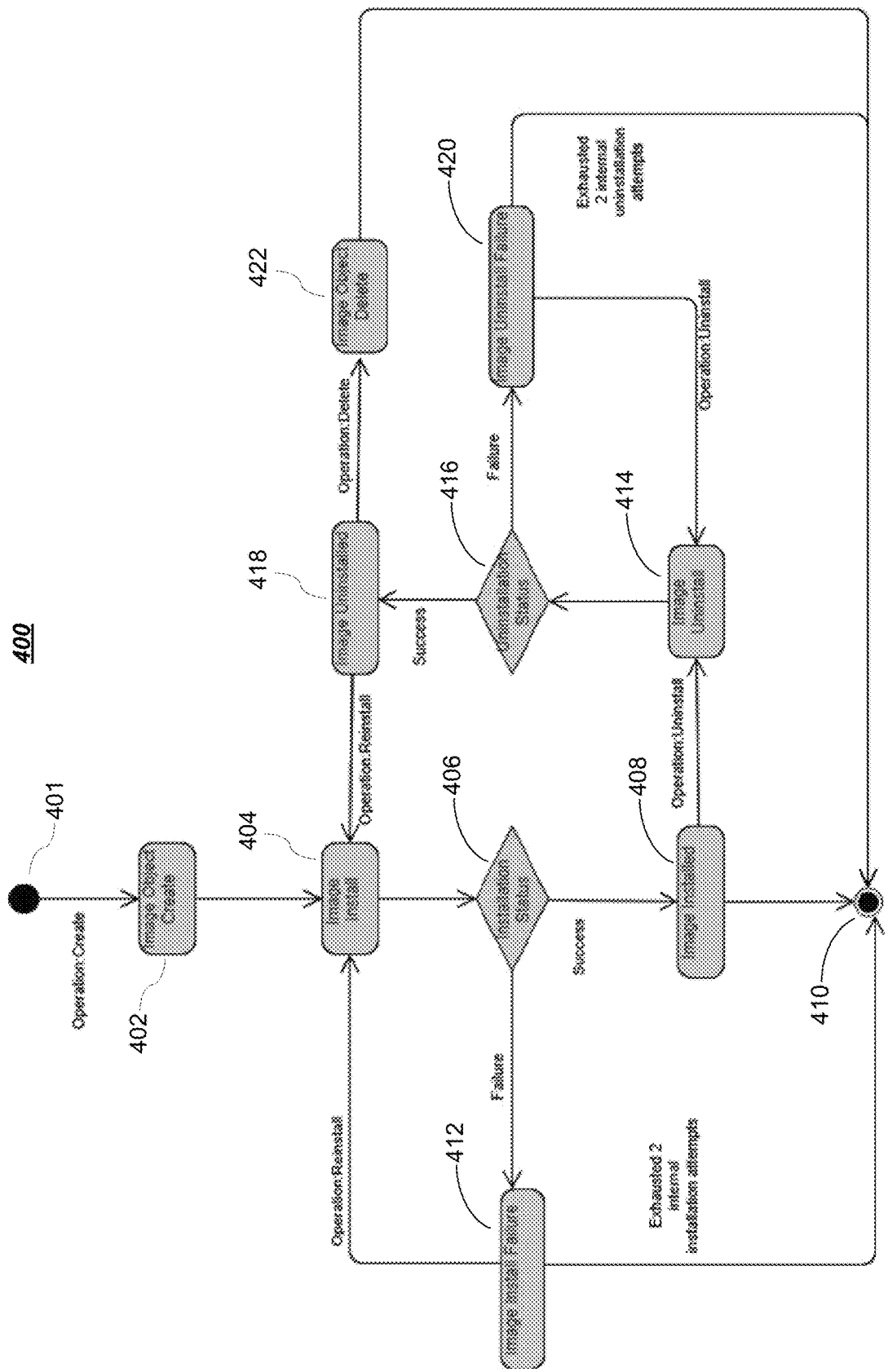
FIG. 4 depicts exemplary application image states and operations for a state machine, according to embodiments of the present disclosure.

FIG. 4 depicts exemplary application image states and operations for a state machine, according to embodiments of the present disclosure. In one or more embodiments, e.g., to manage images across a cluster of switches, such as those depicted in FIG. 2, a leader switch may use state machine states that may start at an initial state (401). The leader switch may create (402) an image object that represents an image. The image may be installed (404) on a number of switches in a cluster of switches that each may represent node in the cluster. The installation status (406) may be determined, e.g., by the leader switch, which may obtain the status from a switch. If installation is successful, the state machine may resume by installing the image to reach a termination point or state (410), which may be the same or similar as an initial state. If image installation has failed (412), the state machine may again attempt to install (404) the image, e.g., as part of an auto-recovery mechanism. It is understood that, in response to performing a number of installation attempts, the state machine may reach (410) the termination point.

Figure 5:
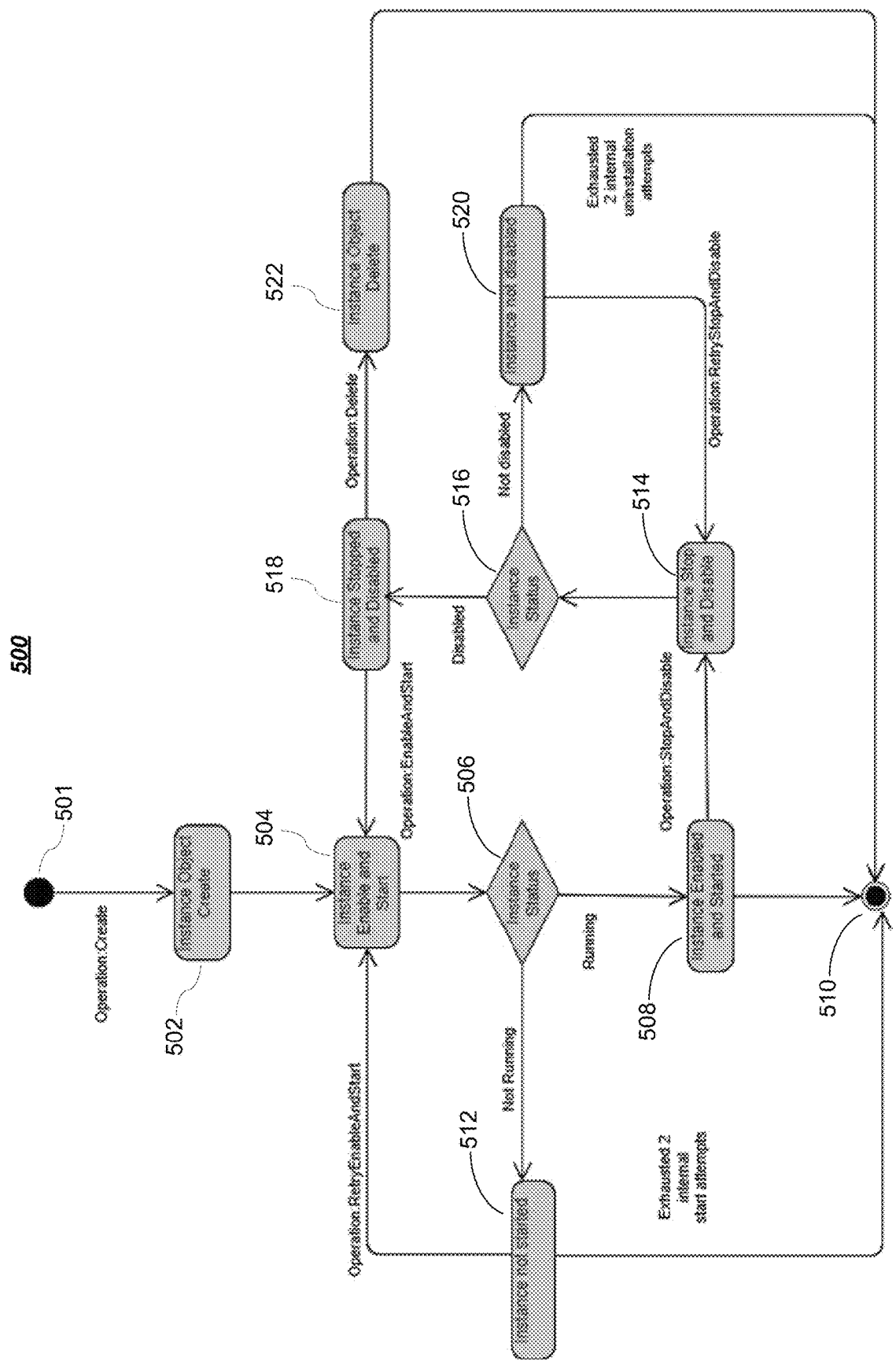
FIG. 5 depicts exemplary application instance states and operations for a state machine, according to embodiments of the present disclosure.

In one or more embodiments, once the image is successfully installed on a cluster of switches, an instance object that uses the image, such as that shown in FIG. 5, may be created, enabled, and started on any number of switches within a cluster. Once the application image is no longer needed, e.g., after all application instances have been deleted, a user may cause the image to be uninstalled (414). If uninstallation is determined (416) to be successful (418), the image object may be deleted (422), at which time the state machine reaches (410) the termination point. If uninstallation is unsuccessful (420) several times, the state machine may terminate (410). It is understood that even after an uninstall operation (418), a user may decide to reinstall the image (404) instead of deleting the image object (422).

FIG. 5 depicts exemplary application instance states and operations for a state machine, according to embodiments of the present disclosure. Similar to FIG. 4, in one or more embodiments, to manage application instance across a cluster of switches, a leader switch may use a state machine that starts at initial state (501). The leader switch's application instance may create (502) an instance object that represents a fabric management application. An instance may be enabled and started (504) on a number of switches in a cluster of switches. The leader application instance may determine (506) the instance status, and if the instance is running after being enabled and started (508), the state machine may reach a termination point (510), e.g., return to an initial state. Contrariwise, if the instance is not running (512), the state machine may re-attempt to start (504) the instance. In one or more embodiments, if after a number of attempts the instance is not running, the state machine reaches (510) the termination point.

In one or more embodiments, once the instance is running, a user may decide to stop and or disable (514) the instance. If the instance status is determined (516) to be stopped and/or disabled (518), the instance object may be deleted (522), at which time the state machine reaches (510) the termination point. If disabling is unsuccessful (520), e.g., for a number of uninstallation attempts, the state machine may terminate (510). It is understood that even after an instance has been stopped and/or disabled (518), a user may decide to enable the instance (504) again). It is noted that all instances should be disabled (518) before uninstalling an image according to FIG. 4.

Figure 6:
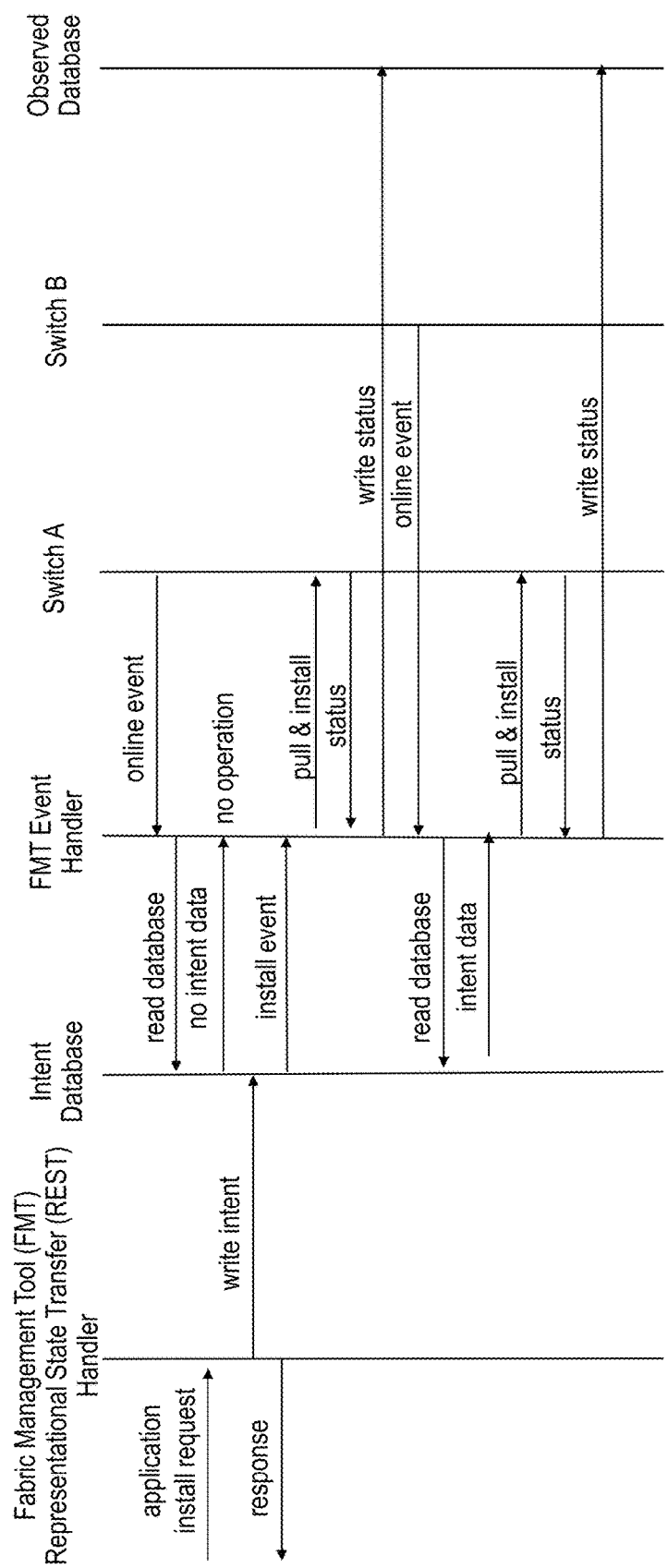
FIG. 6 depicts an exemplary sequence diagram for operating network switches, according to embodiments of the present disclosure.

FIG. 6 depicts an exemplary sequence diagram for operating a cluster of network switches, according to embodiments of the present disclosure. As depicted, FIG. 6 comprises a fabric management REST handler, an intent database, a fabric management event handler, switch A and switch B that come online at different times, and observed database. In one or more embodiments, in response to switch A coming online, the fabric management event handler may access the intent database to attempt to obtain intent data associated with a third-party application. If no intent data is found, the fabric management event handler may refrain from performing an action.

In one or more embodiments, in response to an application installation request being received, e.g., from an administrator, the fabric management REST handler may write intent data that reflects an install event to the intent database according to the install request and respond with a confirmation. The intent database may notify the fabric management event handler of an install event to cause the fabric management event handler to perform, in accordance with the intent, operations such as pulling and installing an image on switch A. It is understood that, in one or more embodiments, suitable operations may comprise pushing operations instead of pulling operations, e.g., an operation in which switch A is provided with the image instead of being asked to download an image from an IP address.

In one or more embodiments, once switch A performs the requested operations, it may communicate information regarding its status to the fabric management event handler, which may write the status to the observed database. In one or more embodiments, in response to switch B coming online, the fabric management event handler may again access the intent database to determine obtain intent data associated with switch B. If such data is available, the fabric management event handler may perform operations to install an image on switch B and communicate its status to the fabric management event handler, which may write the status to the observed database.

Other operations on containerized images and actions that may be supported by the fabric management tool (not shown in FIG. 6) comprise image related operations, such as POST new application image, e.g., to install the image on nodes; POST uninstall image action, e.g., to uninstall image nodes or for use during uninstallation failures; POST reinstall image action, e.g., to reinstall an uninstalled image or to retry installation; DELETE an image, e.g., to uninstall and clear an intent database entry. Further, operations may be application related, such as POST new application instance, e.g., to enable and start a new application instance; POST stop and disable action, e.g., to stop and disable an application; POST enable and start action, e.g., to re-enable and start an application; POST retry for stop and disable action, e.g., to retry a failed stop and disable action; POST retry for enable and start action, e.g., to retry a failed enable and start action; DELETE application instance, e.g., to stop and disable an application and clearing the intent database entry.

In one or more embodiments, as previously discussed with reference to FIG. 4 and FIG. 5, a fabric management tool may maintain a state machine for image and instance related operations. In one or more embodiments, the fabric management tool periodically, or at varying times, may perform an audit, e.g., to compare the content of the intent database with the actual state of an application in the switch to detect and correct a mismatch.

Figure 7:
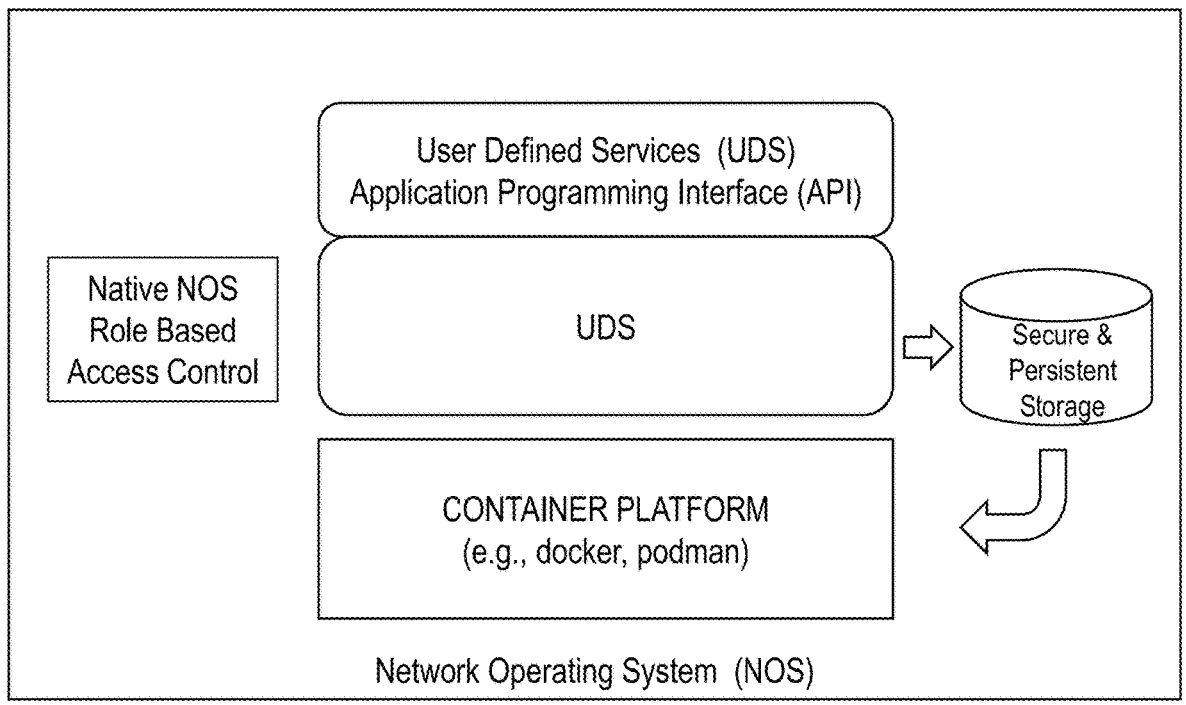
FIG. 7 depicts an exemplary user-defined services (UDS) architecture that operates on a network operating system (NOS), according to embodiments of the present disclosure.

FIG. 7 depicts an exemplary UDS architecture that operates on an NOS, according to embodiments of the present disclosure. Architecture 700, which may be implemented on a switch to perform cluster-wide deployment and manage containers across a cluster according to various embodiments herein may comprise an NOS that operates on a native NOS, which provides role-based access control. As depicted, in one or more embodiments, architecture 700 may comprise UDS that communicate with an UDS API. The UDS may, unlike common installations on server CPUs, reserve separate, local, and secure storage for user services implemented with container images. Container images may be stored in a persistent manner to make them available, e.g., during upgrades. Advantageously, this eliminates the need for an external registry. Further, as discussed in greater detail with reference to FIG. 9, in one or more embodiments, strict validation procedures may be implemented to ensure the security of installed services, e.g., by verifying and/or authenticating the origin of a particular service. Further, architecture 700 may limit or block user access to IP tables, registrations, file systems, services, etc., to prevent interference with switching functions of the switch that may otherwise disturb network traffic.

In one or more embodiments, UDS may use the native NOS of the switch to manage access rights and privileges, e.g., to determine the extent of user services that a user account is permitted to install, run, remove, etc. In one or more embodiments, UDS architecture 700 may provide an abstract API for managing container services within the context of container orchestration, independently of a relative complex container orchestration platform or container run-time platform that is commonly used to manage containers across a number of servers.

Figure 8:
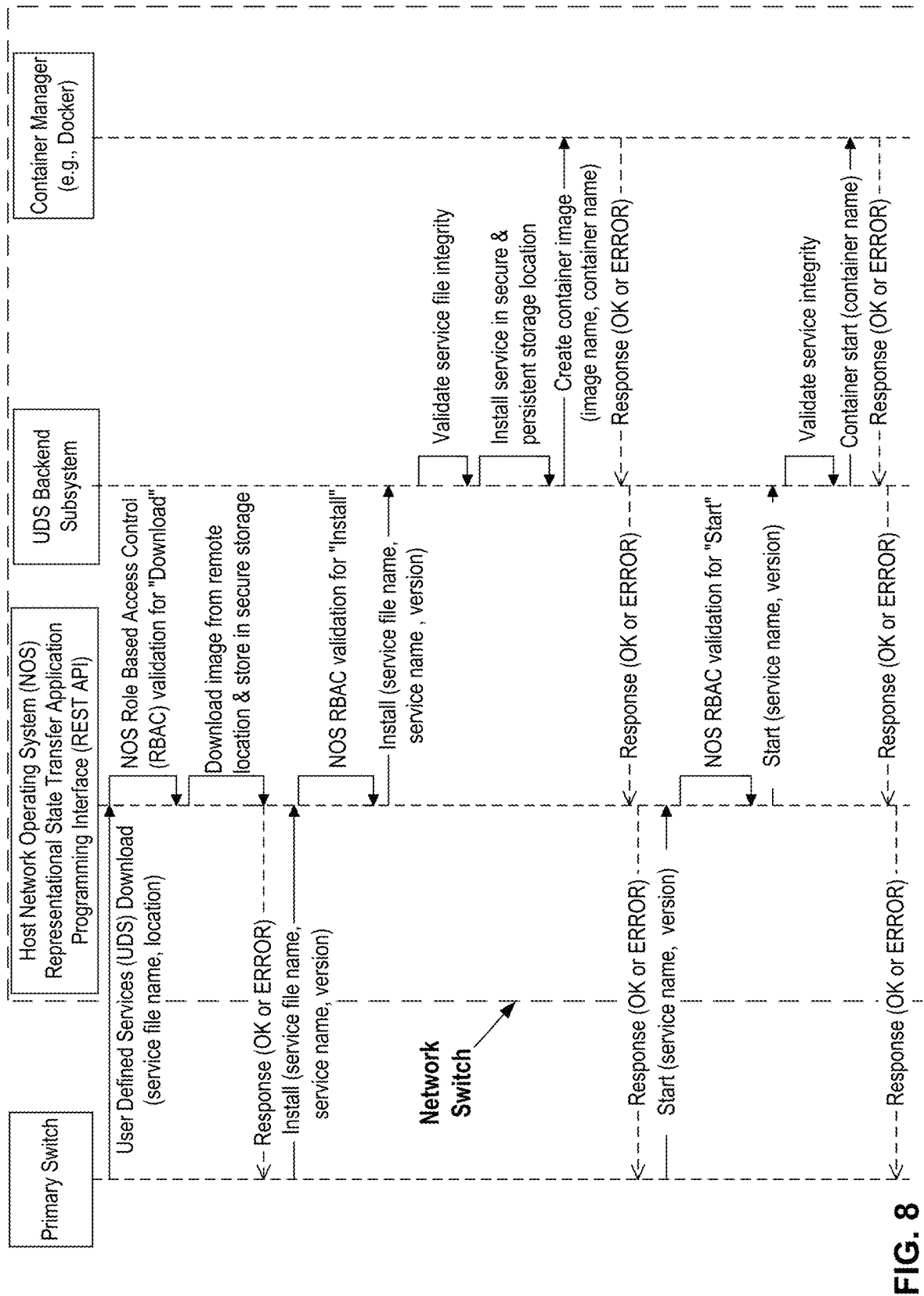
FIG. 8 depicts an exemplary process that utilizes UDS to automatically install a third-party containerized application on network switches, according to embodiments of the present disclosure.

FIG. 8 depicts an exemplary process that utilizes UDS to automatically install a third-party containerized application on network switches, according to embodiments of the present disclosure. In one or more embodiments, for some or all nodes in a cluster of network switches, a leader switch may initiate an UDS download API call via host REST API to the switches in the cluster to download an image from a given location. The API may, e.g., after performing an image validation process to verify that the image was properly downloaded on the host NOS, e.g., from a remote location, store the image in a secure location, and communicate a successful download back to the leader switch.

In one or more embodiments, the leader switch may initiate an UDS install API call to the host REST API, which may perform a validation to verify that the installation request was proper, e.g., before causing the image to be installed. In one or more embodiments, the UDS backend system may in response to validating the integrity of the service file, install the image in a secure, persistent location and initiate a call to the container management system to create a container image. In response, the container management system may communicate a successful creation message to the leader switch, e.g., via the UDS backend system and host NOS.

In one or more embodiments, once the container is successfully created, the leader switch may initiate a call to the host NOS to start an application. The host NOS, after validating the call, may communicate the call to the UDS backend system that may perform its own validation before causing the container management system to start an application and respond with a confirmation message that the start was successful. This message may be communicated back to the leader switch.

It is understood that basic container management tasks such as starting a container are significantly different from the management functions, such as image distribution and installation, lifecycle management, upgrade functions, and the like that are performed by the leader switch when using the leader switch as a container orchestrator. It is further understood that, in one or more embodiments, a user may override various defaults steps such as when and whether a particular image or version of an image should be installed, upgraded, or otherwise manipulated.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a CPU or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 9:
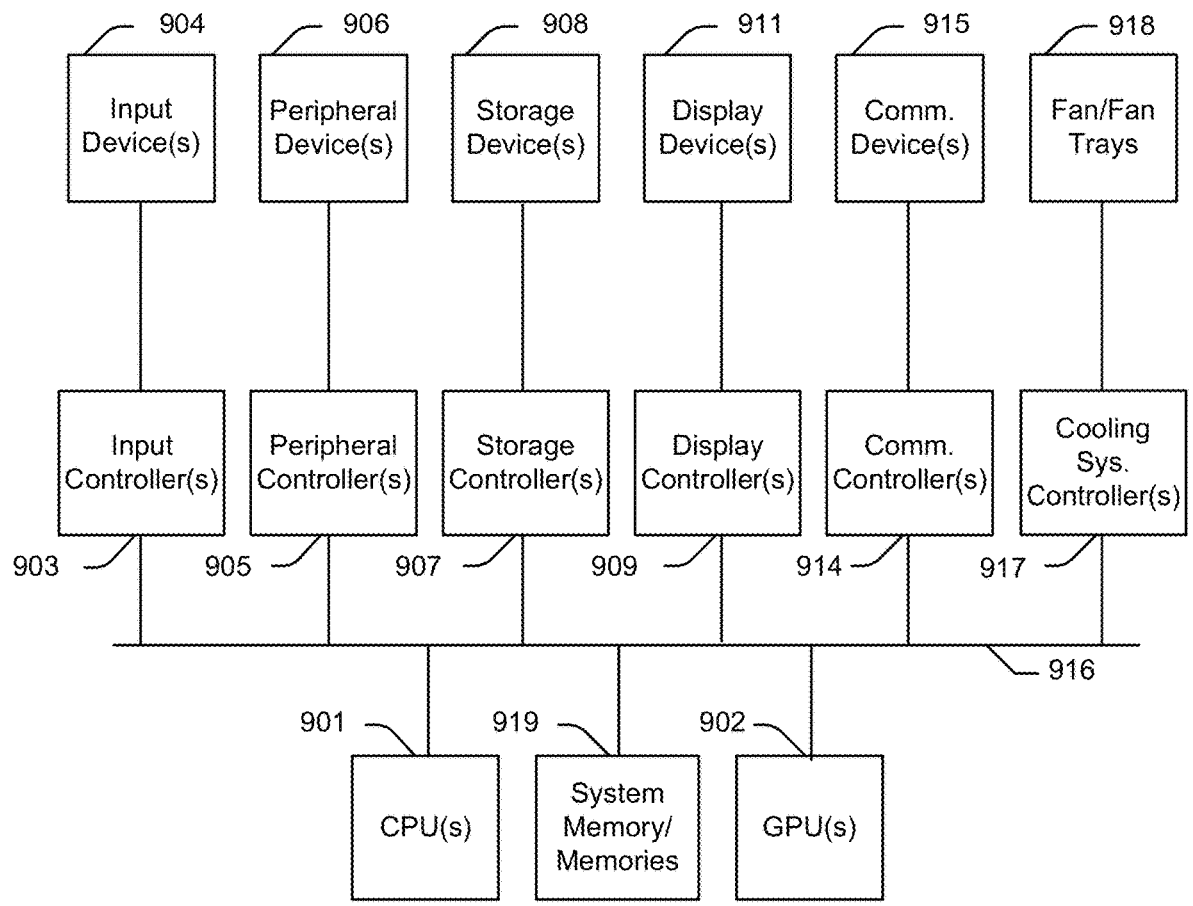
FIG. 9 depicts a simplified block diagram of an information handling system, according to embodiments of the present disclosure.

FIG. 9 depicts a simplified block diagram of an information handling system (or computing system), according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more CPUs 901 that provides computing resources and controls the computer. CPU 901 may be implemented with a microprocessor or the like and may also include one or more graphics processing units (GPU) 902 and/or a floating-point coprocessor for mathematical computations. In one or more embodiments, one or more GPUs 902 may be incorporated within the display controller 909, such as part of a graphics card or cards. The system 900 may also include a system memory 919, which may comprise RAM, ROM, or both.

A number of controllers and peripheral devices may also be provided, as shown in FIG. 9. An input controller 903 represents an interface to various input device(s) 904, such as a keyboard, mouse, touchscreen, stylus, microphone, camera, trackpad, display, etc. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present disclosure. Storage device(s) 908 may also be used to store processed data or data to be processed in accordance with the disclosure. The system 900 may also include a display controller 909 for providing an interface to a display device 911, which may be a cathode ray tube (CRT) display, a thin film transistor (TFT) display, organic light-emitting diode, electroluminescent panel, plasma panel, or any other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 900 comprises one or more fans or fan trays 918 and a cooling subsystem controller or controllers 917 that monitors thermal temperature(s) of the system 900 (or components thereof) and operates the fans/fan trays 918 to help regulate the temperature.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 10:
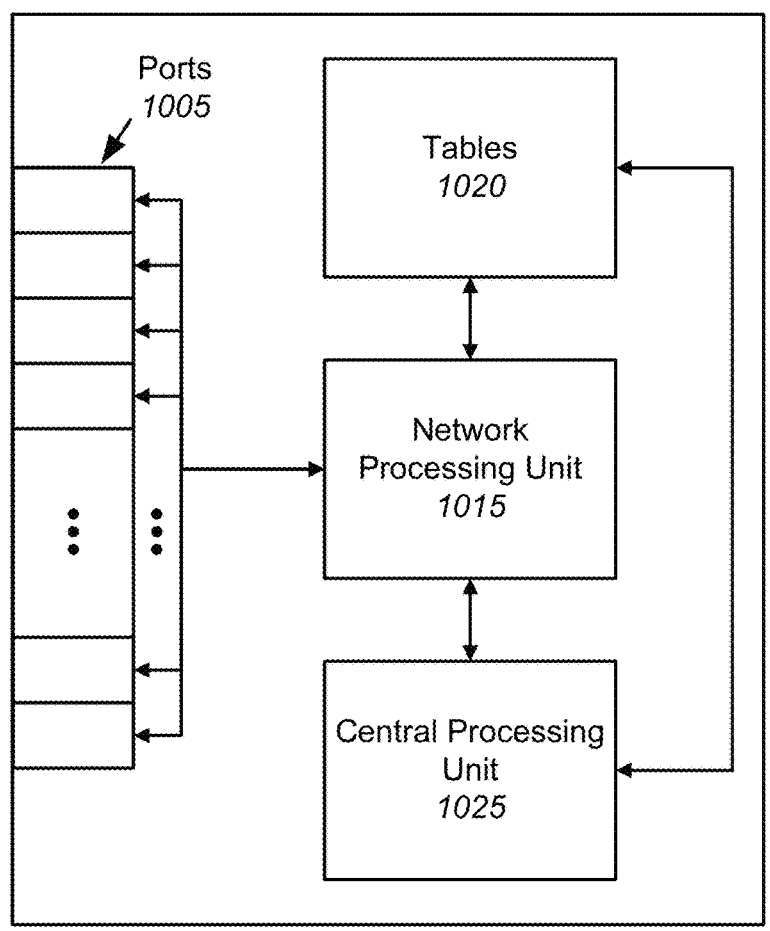
FIG. 10 depicts an alternative block diagram of an information handling system, according to embodiments of the present disclosure.

FIG. 10 depicts an alternative block diagram of an information handling system, according to embodiments of the present disclosure. It will be understood that the functionalities shown for system 1000 may operate to support various embodiments of the present disclosure—although it shall be understood that such system may be differently configured and include different components, additional components, or fewer components.

The information handling system 1000 may include a plurality of I/O ports 1005, a NPU 1015, one or more tables 1020, and a CPU 1025. The system includes a power supply (not shown) and may also include other components, which are not shown for sake of simplicity.

In one or more embodiments, the I/O ports 1005 may be connected via one or more cables to one or more other network devices or clients. The network processing unit 1015 may use information included in the network data received at the node 1000, as well as information stored in the tables 1020, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method comprising:
    in response to a leader information handling system in a cluster of information handling systems receiving at an application programming interface (API) a command, using the leader information handling system as a container orchestrator that uses the API to distribute a containerized application to one or more information handling systems in the cluster, which has been created by a fabric management application, by providing to the one or more information handling systems a download request and a location information regarding an image repository, the image repository comprising an image that is associated with the containerized application; and
    in response to input from a user, an action from the fabric management application, or an action from the leader information handling system, instructing, via the fabric management application or the leader information handling system, at least one of the one or more information handling systems to perform steps comprising at least one of enabling or executing the containerized application following the at least one of the one or more information handling systems downloading and installing the image.

2. The processor-implemented method of claim 1, wherein the fabric management application manages access rights to central processing unit resources of an information handling system among the one or more information handling systems such as to decouple data handling operations of the information handling system from fabric management application operations that use the information handling system as a compute node.

3. The processor-implemented method of claim 2, wherein the fabric management application restricts access rights to central processing unit resources of the information handling system when updating the cluster of information handling systems.

4. The processor-implemented method of claim 1, wherein the containerized application is a third-party application whose operations are at least partially centrally managed by the fabric management application to automatically run on the one or more information handling systems without user intervention.

5. The processor-implemented method of claim 4, wherein the fabric management application uses the API to monitor a lifecycle of the third- party application and manage it independently from a lifecycle of an operating system of the information handling system, the third-party application being upgraded without upgrading the operating system of the information handling system.

6. The processor-implemented method of claim 1, wherein the leader information handling system causes at least one of the one or more information handling systems to validate, prior to enabling the containerized application, a process comprising at least one of a download, integrity of a user-defined services file, or an installation of the image in a secure location.

7. The processor-implemented method of claim 1, wherein the command is stored in an intent database that comprises a mapping of a set of policies for operating the containerized application to a set of information handling system functions and/or parameters.

8. The processor-implemented method of claim 7, wherein the fabric management application compares a content of the intent database with an actual state of the containerized application to correct a mismatch.

9. The processor-implemented method of claim 1, wherein the leader information handling system performs the step of, in response to a leader information handling system in a cluster of information handling systems receiving at an application programming interface (API) a command, using the leader information handling system as a container orchestrator that uses the API to distribute a containerized application to one or more information handling systems in the cluster, which has been created by a fabric management application, by providing to the one or more information handling systems a download request and a location information regarding an image repository, the image repository comprising an image that is associated with the containerized application, without using a separate registry infrastructure for the containerized application.

10. A non-transitory computer-readable medium or media comprising one or more sequences of instructions which, when executed by at least one processor, causes steps to be performed comprising:
    in response to a leader information handling system in a cluster of information handling systems receiving at an application programming interface (API) a command, using the leader information handling system as a container orchestrator that uses the API to distribute a containerized application to one or more information handling systems in the cluster, which has been created by a fabric management application, by providing to the one or more information handling systems a download request and a location information regarding an image repository, the image repository comprising an image that is associated with the containerized application; and
    in response to input from a user, an action from the fabric management application, or an action from the leader information handling system, instructing, via the fabric management application or the leader information handling system, at least one of the one or more information handling systems to perform steps comprising at least one of enabling or executing the containerized application following the at least one of the one or more information handling systems downloading and installing the image.

11. The non-transitory computer-readable medium or media of claim 10, wherein the fabric management application manages access rights to central processing unit resources of an information handling system among the one or more information handling systems such as to decouple data handling operations of the information handling system from fabric management application operations that use the information handling system as a compute node.

12. The non-transitory computer-readable medium or media of claim 10, wherein the containerized application is a third-party application whose operations are at least partially centrally managed by the fabric management application to automatically run on the one or more information handling systems without user intervention.

13. The non-transitory computer-readable medium or media of claim 10, wherein the leader information handling system causes at least one of the one or more information handling systems to validate, prior to enabling the containerized application, a process comprising at least one of a download, integrity of a user-defined services file, or an installation of the image in a secure location.

14. The non-transitory computer-readable medium or media of claim 10, wherein the command is stored in an intent database that comprises a mapping of a set of policies for operating the containerized application to a set of information handling system functions and/or parameters.

15. An information handling system comprising:
one or more processors; and
a non-transitory computer-readable medium or media comprising one or more sets of instructions which, when executed by at least one of the one or more processors, causes steps to be performed comprising:
in response to a leader information handling system in a cluster of switches information handling systems receiving at an application programming interface (API) a command, using the leader information handling system as a container orchestrator that uses the API to distribute a containerized application to one or more information handling systems in the cluster, which has been created by a fabric management application, by providing to the one or more information handling systems a download request and a location information regarding an image repository, the image repository comprising an image that is associated with the containerized application; and
in response to input from a user, an action from the fabric management application, or an action from the leader information handling system, instructing, via the fabric management application or the leader information handling system, at least one of the one or more information handling systems to perform steps comprising at least one of enabling or executing the containerized application following the at least one of the one or more information handling systems downloading and installing the image.

16. The information handling system of claim 15, wherein the fabric management application manages access rights to central processing unit resources of an information handling system among the one or more information handling systems such as to decouple data handling operations of the information handling system from fabric management application operations that use the switch information handling system as a compute node.

17. The information handling system of claim 16, wherein the fabric management application restricts access rights to central processing unit resources of the information handling system when updating the cluster of information handling systems.

18. The information handling system of claim 17, wherein the fabric management application uses the API to monitor a lifecycle of the containerized application and manage it independently from a lifecycle of an operating system of the information handling system, the containerized application being upgraded without upgrading the operating system of the information handling system.

19. The information handling system of claim 16, wherein the leader information handling system causes at least one of the one or more information handling systems to validate, prior to enabling the containerized application, a process comprising at least one of a download, integrity of a user defined services file, or an installation of the image in a secure location.

20. The information handling system of claim 16, wherein the command is stored in an intent database that comprises a mapping of a set of policies for operating the containerized application to a set of information handling system functions and/or parameters.

* * * * *